(12) United States Patent
Kuze et al.

(10) Patent No.: US 7,695,008 B2
(45) Date of Patent: Apr. 13, 2010

(54) SENSOR SETUP STRUCTURE

(75) Inventors: Toshiyuki Kuze, Utsunomiya (JP); Fumitoshi Kase, Utsunomiya (JP); Yoshihisa Sugamata, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1093 days.

(21) Appl. No.: 11/200,573

(22) Filed: Aug. 10, 2005

(65) Prior Publication Data

US 2006/0043711 A1 Mar. 2, 2006

(30) Foreign Application Priority Data

Aug. 27, 2004 (JP) .............................. 2004-248144

(51) Int. Cl.
*B60R 21/16* (2006.01)

(52) U.S. Cl. ...................................... 280/735

(58) Field of Classification Search ................ 280/735, 280/781, 785, 124.109; 180/311, 312
See application file for complete search history.

(56) References Cited

U.S. PATENT DOCUMENTS

| | | | |
|---|---|---|---|
| 3,703,300 A * | 11/1972 | Gillund et al. | ............... 280/735 |
| 3,853,199 A | 12/1974 | Hirashima et al. | |
| 5,364,158 A | 11/1994 | Watanabe et al. | |
| 6,170,906 B1 | 1/2001 | Kasuga | |
| 6,382,709 B1 | 5/2002 | Chirifu et al. | |
| 6,598,933 B2 * | 7/2003 | Taguchi et al. | ......... 296/203.02 |
| 2005/0093540 A1 * | 5/2005 | Merrick et al. | ............... 324/239 |

FOREIGN PATENT DOCUMENTS

| | | |
|---|---|---|
| DE | 699 22 466 | 4/2000 |
| EP | 0 995 639 | 4/2000 |
| JP | 5-35510 | 5/1993 |
| JP | 2001-219812 | 8/2001 |

* cited by examiner

*Primary Examiner*—Faye M. Fleming
(74) *Attorney, Agent, or Firm*—Rankin, Hill & Clark LLP

(57) ABSTRACT

A sensor setup structure includes a pair of front side frames that are provided on vehicle widthwise opposite sides of a vehicle front part, and extended along a vehicle lengthwise direction, a pair of upper members that are provided to the vehicle widthwise outsides from these front side frames, and extended from respective front pillars on vehicle widthwise opposite sides downwards to the front, a joining frame that joins in the vehicle widthwise direction between the vicinity of front ends of these upper members and the front side frames on the same sides in the vehicle widthwise direction, and satellite sensors of an airbag apparatus which, in plan view, are setup in positions that are to the vehicle widthwise insides from vehicle widthwise outer surfaces of the respective upper members, and are to the vehicle widthwise outsides from vehicle widthwise outer surfaces of the respective front side frames.

8 Claims, 2 Drawing Sheets

SENSOR SETUP STRUCTURE

Priority is claimed on Japanese Patent Application No. 2004-248144, filed Aug. 27, 2004, the contents of which are incorporated herein by reference.

BACKGROUND OF THE INVENTION

1. Field of the Invention

The present invention relates to a sensor setup structure for a satellite sensor of an airbag apparatus.

2. Description of Related Art

Satellite sensors which detect mainly frontal impact accidents of a vehicle in order to actuate an airbag apparatus, are normally attached to a pair of front side frames provided extendedly along the vehicle lengthwise direction, on vehicle widthwise opposite sides at the front of the vehicle body (for example, refer to Japanese Unexamined Patent Application, First Publication No. 2001-219812).

However, in the above attachment structure, in the case of an offset impact where an impact occurs to the vehicle widthwise outside from the front side frame, the impact force does not act directly on the front side frame provided with the satellite sensor. Therefore, there is a possibly that it takes a longer time from impact occurrence until the impact is detected by the satellite sensor and a signal is transmitted to the controller of the airbag apparatus.

SUMMARY OF THE INVENTION

An object of the present invention is to provide a sensor setup structure which can detect an impact occurrence immediately after impact occurrence, even in the case of an offset impact where the impact occurs to the vehicle widthwise outside from the front side frame.

In order to achieve the above object, the present invention adopts a sensor setup structure of the present invention including: a pair of front side frames that are provided on vehicle widthwise opposite sides of a vehicle body front part, and extended along a vehicle lengthwise direction; a pair of upper members that are provided to the vehicle widthwise outsides from these front side frames, and extended from respective front pillars on vehicle widthwise opposite sides downwards to the front; a joining frame that joins in the vehicle widthwise direction between the vicinity of front ends of these upper members and the front side frames on the same sides in the vehicle widthwise direction; and satellite sensors of an airbag apparatus which, in plan view, are setup in positions that are to the vehicle widthwise insides from vehicle widthwise outer surfaces of the respective upper members, and are to the vehicle widthwise outsides from vehicle widthwise outer surfaces of the respective front side frames.

According to the sensor setup structure, in the case of an offset impact where the impact occurs to the vehicle widthwise outside from the front side frame, deformation of the upper member which is to the vehicle widthwise outside from the front side frame can be promptly detected by the satellite sensor after impact occurrence. Moreover, since the satellite sensors are set up to the vehicle widthwise inside from the vehicle widthwise outer surfaces of the respective upper members, damage of the satellite sensors by, for example, collision with a fender panel at the time of vehicle impact, can be prevented.

The satellite sensors may be set up on the joining frames.

In this case, even if an impact deforms the front side frame prior to the upper member, or even if an impact deforms the upper member prior to the front side frame, the impact occurrence can be promptly detected by the satellite sensors, after impact occurrence.

The satellite sensors may be set up in positions to the rear from front end surfaces of the joining frames.

In this case, damage of the satellite sensor before it detects deformation of the front side frame or the upper member at the time of impact, can be prevented.

DETAILED DESCRIPTION OF THE INVENTION

Hereunder is a description of one embodiment of a sensor setup structure of the present invention, with reference to the drawings.

Figure 1:
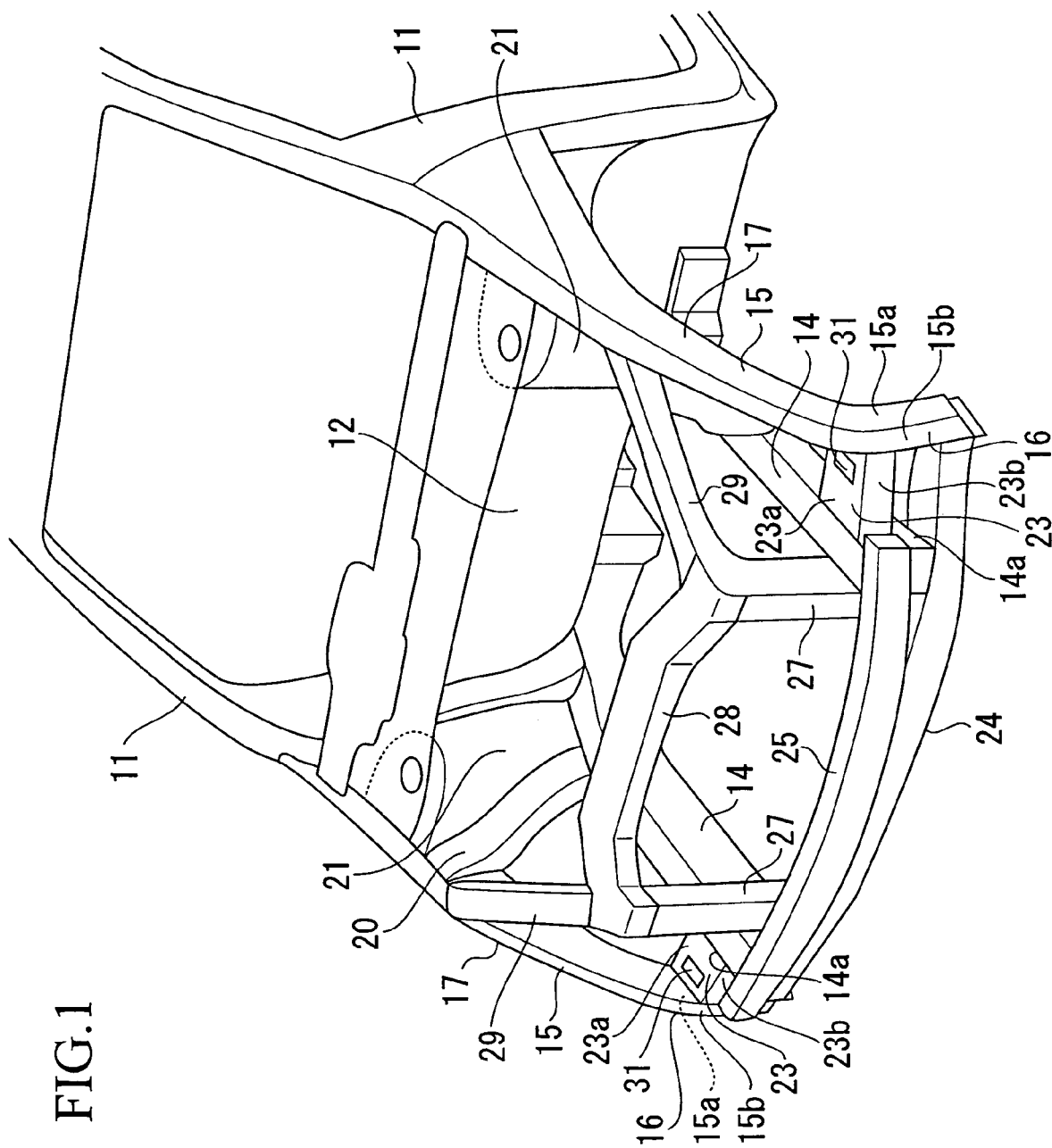
FIG. 1 is a perspective view showing a vehicle body front part of a vehicle to which is applied a sensor setup structure according to one embodiment of the present invention.

FIG. 1 shows the vehicle body front structure of a vehicle to which a sensor setup structure of the present embodiment is applied. As shown in FIG. 1, in the vehicle body front structure of the present embodiment, front pillars 11 which have upper portions inclined downwards to the front and lower portions running approximately vertical to constitute the vehicle chassis, are provided on the vehicle widthwise opposite sides. Furthermore, the vehicle body front structure includes a dashboard lower panel 12 which links a pair of the lower portions of the front pillars 11 along the vehicle widthwise direction, and partitions a vehicle interior and an engine room.

Furthermore, in this vehicle body front structure, a pair of front side frames 14 which are extended along the vehicle lengthwise direction and constitute the vehicle chassis, are provided on the vehicle widthwise opposite sides of the vehicle body lower part, so as to extend from the lower side of the dashboard lower panel 12 towards the vehicle body front.

Moreover, the vehicle body front structure is provided with upper members 15 which constitute the vehicle chassis, extended from vertical middle positions of the respective front pillars 11, downwards towards the vehicle body front. In plan view, the upper members 15 are arranged to vehicle widthwise opposite outsides from the respective front side frames 14. Furthermore, front fender panels (not shown) are attached to the vehicle widthwise outsides of the upper members 15.

The upper members 15 include: vertical extensions 16 disposed on a front end side along the vehicle lengthwise direction, and running approximately vertical; and inclined extensions 17 in which the shapes thereof from the top end of the vertical extensions 16 to the front pillars 11 are inclined upward to the rear while being slightly curved.

The vehicle lengthwise middle portions of the respective inclined extensions 17 and the vehicle lengthwise middle portions of the front side frames 14 on the same sides in the vehicle widthwise direction are joined by joining members 20 respectively.

Damper housings 21 are respectively provided between the joining members 20 and the dashboard lower panel 12. The damper housings 21 are joined to the joining members 20, the inclined extensions 17 of the upper members 15, the front side frames 14, and the dashboard lower panel 12, on the same sides in the vehicle widthwise direction.

The upper portions of the vertical extensions 16 of the respective upper members 15 are provided with joining frames 23 which are extended inwards in the vehicle widthwise direction and are joined to the front side frames 14 on the same sides in the vehicle widthwise direction, to thereby join between the vicinity of the front ends of the upper members 15 and the front side frames 14 in the vehicle widthwise direction, and thus constitute the vehicle chassis.

The lower portions of the vertical extensions 16 of the respective upper members 15 are provided with a cross-member 24 which links the pair of upper members 15 in the vehicle widthwise direction. The lower portions of the front ends of the respective front side frames 14 are joined to the cross-member 24.

A bumper beam 25 which links the pair of front ends of the front side frames 14 along the vehicle widthwise direction, is provided above the cross-member 24.

In addition, there are respectively provided with frames 27 which rise up in substantially vertical directions from the vehicle widthwise insides of the front portions of the respective front side frames 14. Moreover, there is provided with a radiator support member 28 which links a pair of upper portions of the frames 27 in the vehicle widthwise direction. Furthermore, there are respectively provided with joining members 29 which link the frames 27 and the upper members 15 on the same sides in the vehicle widthwise direction.

In the present embodiment, satellite sensors 31 are respectively setup in positions which are to the inside from the vehicle widthwise outer surfaces 15a in the vicinity of the front ends of the respective upper members 15, and to the outside from the vehicle widthwise outer surfaces 14a of the front side frames 14 on the same sides in the vehicle widthwise direction. Specifically, the satellite sensors 31 are setup in positions which are at the top surfaces 23a of the joining frames 23 that join the upper members 15 and the front side frames 14 on the same sides in the vehicle widthwise direction, and in the vicinity of the upper members 15 on the same sides in the vehicle widthwise direction. In more detail, the satellite sensors 31 are attached to positions which are to the inside from the vehicle widthwise outer surfaces 15a of the upper members 15 and to the rear in the vehicle lengthwise direction from the front end surfaces 23b of the joining frames 23.

Figure 2:
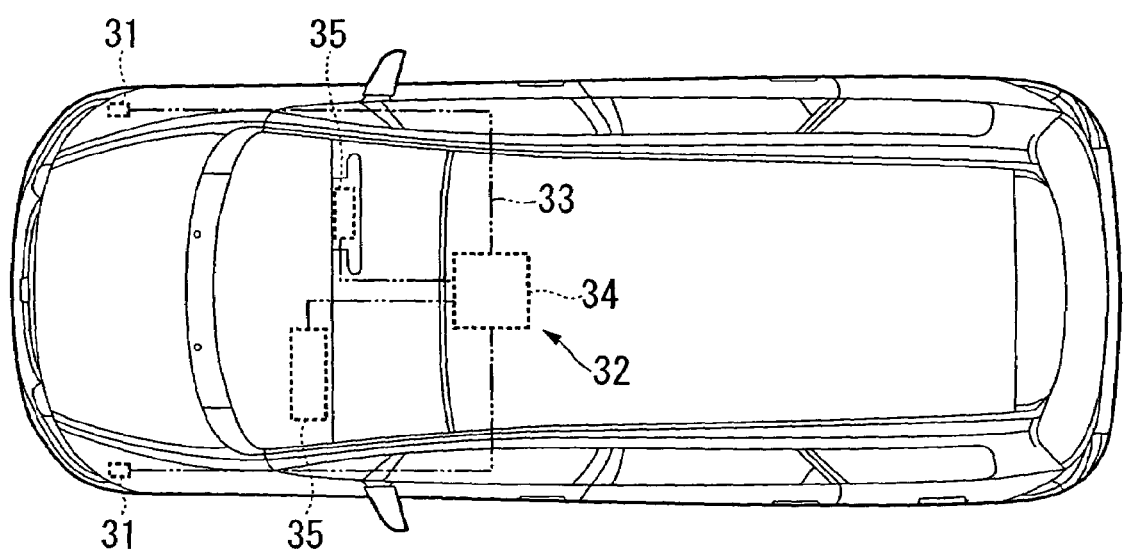
FIG. 2 is a plan view showing a schematic structure of an airbag apparatus in the same vehicle.

The satellite sensors 31 are acceleration sensors which detect acceleration generated at the time of impact occurrence. These satellite sensors 31 constitute a part of an airbag apparatus 32 shown in FIG. 2, and are connected via a harness 33 to an SRS unit 34 serving as a controller for the airbag apparatus 32. The SRS (Supplemental Restraint System) unit 34 detects impact occurrence based on acceleration detected by the satellite sensors 31, and as necessary deploys an airbag deployment apparatus 35 for occupant protection.

In the sensor setup structure of the present embodiment described above, the satellite sensors 31 for the airbag apparatus 32 are setup in positions which are on the vehicle widthwise outsides of the respective front side frames 14, and in the vicinity of the front ends of the upper members 15 extended from the left and right front pillars 11 downwards to the front. More specifically, in plan view, the respective satellite sensors 31 are setup in positions which are to the vehicle widthwise inside from the vehicle widthwise outer surfaces of the respective upper members 15, and to the vehicle widthwise outside from the vehicle widthwise outer surfaces of the respective front side frames 14. As a result, even in the case of an offset impact where an impact occurs to the vehicle widthwise outside from the respective front side frames 14, since the upper members 15 on the vehicle widthwise outsides of the front side frames 14 are deformed from the front end, the impact occurrence can be promptly detected after impact occurrence, by the satellite sensors 31 provided in the vicinity of the front end thereof.

Moreover, since the satellite sensors 31 are set up to the vehicle widthwise inside from the outer surfaces 15a of the respective upper members 15, damage of the satellite sensors 31 by for example collision with the fender panel at the time of vehicle impact, can be prevented.

Specifically, the satellite sensors 31 are set up on the joining frames 23 which connect the front side frames 14 and the vicinity of the front ends of the respective upper members 15 on the vehicle widthwise outside thereof, along the vehicle widthwise direction. Therefore, even if an impact deforms the front side frames 14 prior to the upper members 15, or even if the impact deforms the upper members 15 prior to the front side frames 14, the impact occurrence can be promptly detected by the satellite sensors 31, after impact occurrence.

Moreover, the satellite sensors 31 are set up in positions which are to the rear in the vehicle lengthwise direction from the front end surfaces 23b of the joining frames 23. Therefore, damage of the satellite sensor 31 before they detect deformation of the front side frames 14 or the upper members 15 at the time of impact, can be prevented.

In the present embodiment described above, a case where the satellite sensors 31 are set up on the joining frames 23 in the vicinity of the front ends of the respective upper members 15 was described as an example. However, the satellite sensors 31 may be provided on the respective front ends of the upper members 15. In this case, the satellite sensors 31 are preferably set up in positions which are to the inside from the vehicle widthwise outer surfaces 15a of the respective upper members 15, and to the rear in the vehicle lengthwise direction from the front end surfaces 15b of the respective upper members 15.

While preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A sensor setup structure comprising:
a pair of front side frames that are provided on vehicle widthwise opposite sides of a vehicle body front part, and extended along a vehicle lengthwise direction;
a pair of upper members that are provided to the vehicle widthwise outsides from said front side frames, and extended from respective front pillars on vehicle widthwise opposite sides downwards to the front;
a joining frame that joins in the vehicle widthwise direction between the vicinity of front ends of said upper members and said front side frames on the same sides in the vehicle widthwise direction; and
satellite sensors of an airbag apparatus which, in plan view, are setup in positions that are to the vehicle widthwise insides from vehicle widthwise outer surfaces of said respective upper members, and are to the vehicle widthwise outsides from vehicle widthwise outer surfaces of said respective front side frames, wherein said satellite sensors are set up on said joining frame.

2. A sensor setup structure according to claim 1, wherein said satellite sensors are set up in positions to the rear from front end surfaces of said joining frames.

3. A sensor setup structure, comprising:
- a pair of front side frames that are provided on vehicle widthwise opposite sides of a vehicle body front part, and extend along a vehicle lengthwise direction;
- a pair of upper members that are provided to the vehicle widthwise outsides from the front side frames, and extend from respective front pillars on vehicle widthwise opposite sides downwards to the front; and
- a joining frame that includes a front end surface extending substantially perpendicularly to the front side frame, and joins, in the vehicle widthwise direction, the front side frame and the upper member at a front end vicinity thereof, wherein
- a satellite sensor of an airbag apparatus is set up on the joining frame.

4. A sensor setup structure for a vehicle, comprising:
- first and second upper members that extend in a lengthwise direction of the vehicle from respective first and second front pillars toward a front of the vehicle and are disposed on opposite vehicle sides in a widthwise direction of the vehicle;
- first and second front side frames that extend in the lengthwise direction of the vehicle and are disposed on opposite vehicle sides in the widthwise direction of the vehicle, wherein the first and second front side frames are disposed medial to the first and second upper members, respectively;
- first and second joining frames that extend in the vehicle widthwise direction between front ends of the respective first and second upper members and the respective first and second front side frames; and
- first and second satellite sensors of an airbag apparatus which, in plan view, are disposed medial to the respective first and second upper members and lateral to the respective first and second front side frames in the vehicle widthwise direction, wherein the first and second satellite sensors are disposed on said first and second joining frames, respectively.

5. The sensor setup structure according to claim 4, wherein said first and second satellite sensors are rearwardly disposed from front end surfaces of the first and second joining frames, respectively.

6. A sensor setup structure comprising:
- a pair of front side frames that are provided on vehicle widthwise opposite sides of a vehicle body front part, and extended along a vehicle lengthwise direction;
- a pair of upper members that are provided to the vehicle widthwise outsides from said front side frames, and extended from respective front pillars on vehicle widthwise opposite sides downwards to the front;
- a joining frame that joins in the vehicle widthwise direction between the vicinity of front ends of said upper members and said front side frames on the same sides, the joining frame having a front end surface which is substantially perpendicular to the front side frame; and
- satellite sensors of an airbag apparatus, that are set up on said joining frame.

7. A sensor setup structure according to claim 6, wherein the satellite sensors, in plan view, are setup in positions that are to the vehicle widthwise insides from vehicle widthwise outer surfaces of said respective upper members, and are to the vehicle widthwise outsides from vehicle widthwise outer surfaces of said respective front side frames.

8. A sensor setup structure according to claim 7, wherein said satellite sensors are set up in positions to the rear from the front end surface of said joining frame.

* * * * *